Feb. 13, 1962   J. J. RODAK   3,021,442
DYNAMOELECTRIC MACHINE
Filed Dec. 26, 1958
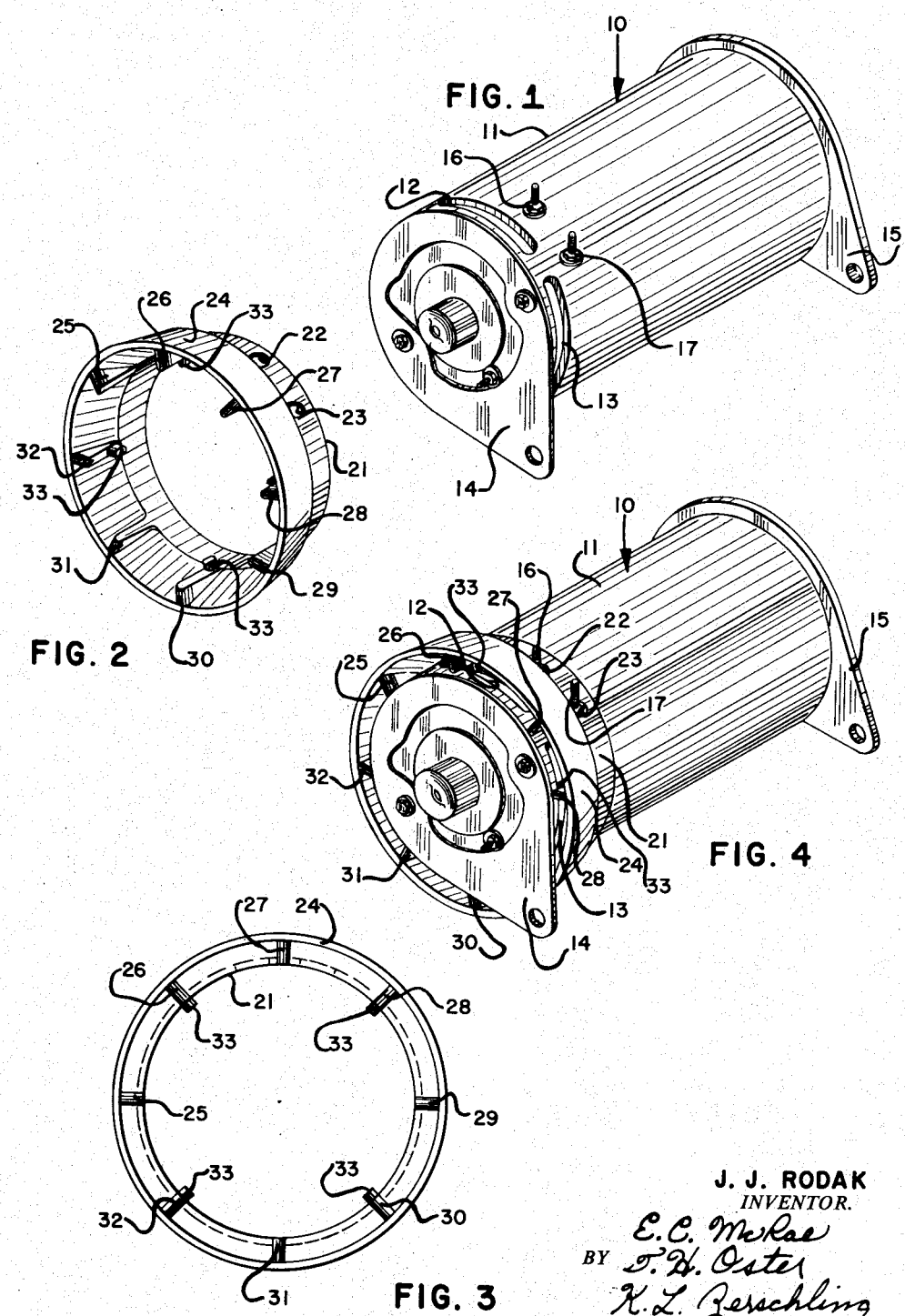
J. J. RODAK
INVENTOR.
BY E.C. McRae
T. H. Oster
K. L. Zerschling
ATTORNEYS

United States Patent Office 3,021,442
Patented Feb. 13, 1962

3,021,442
DYNAMOELECTRIC MACHINE
Joseph J. Rodak, Dearborn, Mich., assignor to Ford Motor Company, Dearborn, Mich., a corporation of Delaware
Filed Dec. 26, 1958, Ser. No. 783,041
5 Claims. (Cl. 310—60)

This invention relates to a dynamoelectric machine and more particularly to a protective cover for such a machine which has a portion thereof fitting in spaced relationship over slots provided for the passage of cooling and ventilating air.

Although not so limited the present invention is particularly applicable for use with a generator of an automotive vehicle. The generation of electricity at full capacity by this type of generator produces heat which if it becomes excessive, may damage the insulation covering the windings of the generator. Most of these machines, therefore, employ a ventilating and cooling system which includes a fan mounted directly behind the driving pulley and a plurality of slots in each end of the machine. In many of such machines the slots at the end opposite the fan are positioned in the cylindrical frame member and are located directly over the commutator and the brushes. The fan pulls air into the machine through the slots in the frame and exhausts the air through the slots in the front of the machine adjacent the fan.

With the slots for ventilating and cooling positioned adjacent the commutator and armature, dirt, water and other contaminants are quite likely to splash or fall into the interior of the machine thereby contaminating the commutator and the brushes and preventing effective commutation. The present invention has been developed to eliminate these difficulties and comprises a protective cover for these slots which is preferably formed of an elastomer such as synthetic rubber. The protective cover comprises a first portion, preferably a band surrounding the machine adjacent the slots and a second portion or shroud positioned in spaced relationship over the slots so that dirt, water and other contaminants will not fall into the machine and so that the passage of cooling and ventilating air will proceed without interference.

An object of the present invention is the provision of a protective cover which fits over the ventilating and cooling slots of a dynamoelectric machine.

Another object of the invention is the provision of a protective means for the ventilating and cooling slots of a dynamoelectric machine which has a portion positioned in spaced relationship over the slots.

Another object of the invention is to provide a protective cover for ventilating and cooling slots of a dynamoelectric machine which prevents water and foreign dirt particles from entering the machine but which permits a free flow of cooling air.

Other objects and advantages of this invention will become more apparent as the description proceeds, particularly when considered in connection with the accompanying drawings in which:

FIGURE 1 is a perspective view of a dynamoelectric machine employed with the present invention;

FIGURE 2 is a perspective view of the protective cover of the present invention;

FIGURE 3 is an end view of the protective cover shown in FIGURE 2; and,

FIGURE 4 is a perspective view of the dynamoelectric machine shown in FIGURE 1 having the protective cover shown in FIGURES 2 and 3 mounted thereon.

Referring now to the drawings in which like reference numerals designate like parts throughout the several views thereof, there is shown in FIGURE 1 a dynamoelectric machine, for example, an automotive generator, generally designated by the numeral 10. The generator includes a cylindrical frame 11 having a plurality of circumferential slots designated by the numerals 12 and 13 positioned at one end thereof. A pair of end plates 14 and 15 are provided for mounting the generator on the engine. A pulley including a fan (not shown) is positioned on the armature shaft at the end opposite the circumferential slots 12 and 13 for driving the generator and for producing a flow of cooling air through the slots 12 and 13, through the frame member 11 and then through holes (not shown) in the end plate 15. A pair of field winding terminals 16 and 17 project through the cylindrical frame member 11 and provide a means for connecting the field windings to an external circuit.

It is obvious that when such a machine is mounted on an automotive vehicle that dirt, water and other foreign contaminants may fall or be splashed into the machine through the slots 12 and 13 and may contaminate the commutator and brushes which are located adjacent these slots. In order to obviate this difficulty and to provide for the free passage of cooling air through the machine, the protective cover shown in FIGURES 2 and 3 was developed. This cover may be constructed of an elastomer, preferably synthetic rubber, and comprises a first portion, preferably a cylindrical band 21, having two apertures 22 and 23 positioned therein for the reception of the field terminals 16 and 17. This cylindrical band has a diameter slightly smaller than the diameter of the cylindrical frame 11 when the protective cover is unmounted as shown in FIGURE 2. The protective cover includes a second portion, preferably a shroud 24, which is connected to the band 21 and has a diameter greater than the band 21 and greater than the diameter of the cylindrical frame 11. The shroud has a plurality of radially inwardly extending struts designated by the numerals 25 thru 32, the inner surfaces of which define an imaginary cylinder which has a diameter substantially equal to the diameter of the band 21 and the cylindrical frame 11. Certain of these struts have inwardly extending tabs 33 positioned on the inner surface thereof and at the end of the strut adjacent the band 21. As shown in the drawings, alternate struts are provided with the tabs.

Referring now to FIGURE 4 which shows the protective cover mounted upon the dynamoelectric machine 10, it can readily be seen that the cylindrical band 21 is positioned in engagement with the cylindrical frame portion 11 of the machine adjacent the slots 12 and 13 with the field terminals 16 and 17 projecting through the apertures 22 and 23. Since the cylindrical band 21 has a diameter slightly less than the diameter of the cylindrical frame 11 when the cover is in the unmounted position, the band will grip the frame, when mounted, to hold the cover in position. The shroud portion 24 of the protective cover is positioned directly over the circumferential slots 12 and 13 and is held in spaced relationship to the cylindrical frame 11 and the slots by means of the struts 25 thru 32, the inner surfaces of which engage the cylindrical frame 11. The tabs 33 which extend from the struts are positioned in the slots and together with the field terminals 16 and 17 limit the axial movement of the protective cover on the machine so that the shroud 24 will remain in position over the slots 12 and 13.

As shown in the drawings, one edge of each of the tabs 33 is in engagement with the walls of the slots 12 and 13 nearest the end plate 15 and this represents the limit of the axial movement of the shroud 24 in a direction toward the end plate 15. The axial movement of the shroud 24 in the direction toward the end plate 14 is limited by the engagement of the other end of each of the tabs 33 with the walls of the slots nearest the end plate 14.

It can be appreciated from an inspection of FIGURE 4 that foreign contaminants, such as dirt and water which may fall or be splashed against the machine, cannot gain entry through the slots 12 and 13 since such contaminants will be deflected by the shroud 24. However, sufficient area between the shroud 24 and the frame 11 is provided to permit adequate quantities of cooling air to flow the machine via the slots 12 and 13. Thus the present invention provides a protective cover for the ventilating and cooling slots of a dynamoelectric machine which excludes dirt and water from the interior of the machine but which permits an adequate flow of cooling air therethrough.

It will be understood that the invention is not to be limited to the exact construction shown and described but that various changes and modifications may be made without departing from the spirit and scope of the invention as defined in the appended claims.

What is claimed is:

1. In a dynamoelectric machine having a slot for the passage of cooling and ventilating air, a protective cover, said protective cover comprising a band constructed of an elastomer and positioned around said dynamoelectric machine and in contact therewith adjacent said slot, a shroud connected to said band and extending in spaced relationship over said slot, and a plurality of spaced struts extending from said shroud and engaging said dynamoelectric machine for maintaining said shroud in spaced relationship over said slot, certain of said struts having tabs extending therefrom into said slot.

2. In a dynamoelectric machine having a slot for the passage of cooling and ventilating air, a protective cover formed of an elastomer, said protective cover comprising a band positioned in engagement around the periphery of said dynamoelectric machine and adjacent said slot, a shroud connected to said band and having a larger peripheral dimension than said band and said dynamoelectric machine, said shroud being positioned in spaced relationship over said slot, a plurality of spaced struts extending from said shroud and engaging said dynamoelectric machine adjacent said slots for maintaining said shroud in spaced relationship over said slot, certain of said struts having tabs extending therefrom and into said slot.

3. In a dynamoelectric machine having a slot for the passage of cooling and ventilating air, a protective cover formed of an elastomer, said protective cover comprising a cylindrical band positioned around said machine in gripping engagement therewith and being positioned adjacent said slot, a cylindrical shroud connected to said band and having a larger diameter than said band and said dynamoelectric machine, said shroud being positioned in spaced relationship over said slot, a plurality of spaced struts extending radially inwardly from said shroud and having inner surfaces positioned to define an imaginary cylinder having a diameter equal to that of said cylindrical band, the inner surfaces of said struts engaging said dynamoelectric machine adjacent said slots for maintaining said shroud in spaced relationship over said slot, certain of said struts having a tab extending from the inner surface thereof into said slot for maintaining the axial position of said protective cover with respect to said dynamoelectric machine.

4. In a dynamoelectric machine, a frame having a cylindrical wall section, a plurality of slots positioned adjacent one end of said cylindrical wall section and extending around the periphery thereof, a protective cover constructed of an elastomer, said protective cover comprising a cylindrical band positioned around said cylindrical wall section in gripping engagement therewith, said band having a smaller diameter when in the unmounted condition than the diameter of said cylindrical wall section, a shroud formed integrally with said band and extending in spaced relationship over said slots, and a plurality of spaced struts extending from said shroud and engaging said cylindrical wall section for maintaining said shroud in spaced relationship over said slots.

5. In a dynamoelectric machine having a frame, said frame having a plurality of slots positioned adjacent one end and around the periphery thereof, a single piece protective cover constructed of an elastomer, said protective cover comprising a band positioned around said frame adjacent said slots, said band having a smaller inner peripheral dimension when in the unmounted condition than the outer peripheral dimension of the frame whereby said band engages said frame in a gripping relationship, a shroud connected to said band and extending in spaced relationship over said slots, and means extending from said shroud and engaging the frame for maintaining said shroud in spaced relationship over said slots.

References Cited in the file of this patent

UNITED STATES PATENTS

| | | |
|---|---|---|
| 1,267,983 | Curtis | May 28, 1918 |
| 1,998,087 | Kock | Apr. 16, 1935 |
| 2,419,156 | Packer | Apr. 15, 1947 |
| 2,488,365 | Abbott | Nov. 15, 1949 |
| 2,881,337 | Wall | Apr. 7, 1959 |

FOREIGN PATENTS

| | | |
|---|---|---|
| 531,180 | Belgium | Sept. 15, 1954 |